US009434163B2

(12) United States Patent
Hirai

(10) Patent No.: US 9,434,163 B2
(45) Date of Patent: Sep. 6, 2016

(54) METHOD FOR MANUFACTURING LIQUID JETTING APPARATUS AND LIQUID JETTING APPARATUS

(71) Applicant: Brother Kogyo Kabushiki Kaisha, Nagoya-shi, Aichi-ken (JP)

(72) Inventor: Keita Hirai, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/806,829

(22) Filed: Jul. 23, 2015

(65) Prior Publication Data

US 2016/0031215 A1 Feb. 4, 2016

(30) Foreign Application Priority Data

Jul. 31, 2014 (JP) ................................ 2014-155809

(51) Int. Cl.

| | |
|---|---|
| ***B41J 2/045*** | (2006.01) |
| ***B21D 53/76*** | (2006.01) |
| ***B23P 17/00*** | (2006.01) |
| ***B41J 2/14*** | (2006.01) |
| ***B41J 2/16*** | (2006.01) |

(52) U.S. Cl.

CPC ............. *B41J 2/14233* (2013.01); *B41J 2/161* (2013.01); *B41J 2/1626* (2013.01); *B41J 2/1642* (2013.01); *B41J 2/1645* (2013.01); *B41J 2/1646* (2013.01); *B41J 2002/14491* (2013.01)

(58) Field of Classification Search

None

See application file for complete search history.

(56) References Cited

U.S. PATENT DOCUMENTS

2010/0231675 A1 9/2010 Kato
2012/0236083 A1* 9/2012 Mizukami ............ B41J 2/14274 347/70
2013/0162726 A1 6/2013 Mizukami et al.

(Continued)

FOREIGN PATENT DOCUMENTS

CN 101830107 9/2010
CN 103210515 7/2013

(Continued)

OTHER PUBLICATIONS

Extended European Search Report for EP Patent Application No. 15178691.0 dated Dec. 4, 2015.

(Continued)

*Primary Examiner* — Erica Lin

(74) *Attorney, Agent, or Firm* — Frommer Lawrence & Haug LLP

(57) ABSTRACT

A method for manufacturing a liquid jetting apparatus, which is provided with: a flow passage formation member including a pressure chamber, and a piezoelectric actuator having a vibration film provided on the flow passage formation member, a piezoelectric film arranged on the vibration film to correspond to the pressure chamber, first and second electrodes arranged on different surfaces of the piezoelectric film, a first protective film covering the piezoelectric film, a wire connected to the second electrode, and a second protective film covering the wire, includes: forming a first protective film on the vibration film to cover the piezoelectric film and the second electrode; forming the wire and the second protective film to cover the wire with the first protective film covering the piezoelectric film and the second electrode; and removing a part, of the first protective film, that overlaps with the second electrode, after forming the second protective film.

9 Claims, 13 Drawing Sheets

(56) References Cited

U.S. PATENT DOCUMENTS

| | | | |
|---|---|---|---|
| 2014/0160208 A1 | 6/2014 | Hoshino | |
| 2014/0168321 A1 | 6/2014 | Domae | |

FOREIGN PATENT DOCUMENTS

| | | |
|---|---|---|
| CN | 103879146 | 6/2014 |
| CN | 103935127 | 7/2014 |
| JP | 2006/007549 | 1/2006 |
| JP | 2008/149636 | 7/2008 |
| JP | 2014-113807 | 6/2014 |

OTHER PUBLICATIONS

Chinese Office Action for application No. 201510459949.2 dated Jun. 20, 2016.

* cited by examiner

METHOD FOR MANUFACTURING LIQUID JETTING APPARATUS AND LIQUID JETTING APPARATUS

CROSS REFERENCE TO RELATED APPLICATION

The present application claims priority from Japanese Patent Application No. 2014-155809 filed on Jul. 31, 2014, the disclosure of which is incorporated herein by reference in their entirety.

BACKGROUND

1. Field of the Invention

The present teaching relates to a method for manufacturing a liquid jetting apparatus, and to a liquid jetting apparatus.

2. Description of the Related Art

Japanese Patent Application Laid-open No. 2006-7549 discloses an ink jet head as a liquid jetting apparatus. This ink jet head has a flow passage formation substrate formed with ink flow passages such as a plurality of pressure chambers, and a plurality of piezoelectric elements provided on the flow passage formation substrate to correspond to the plurality of pressure chambers.

The plurality of piezoelectric elements are arranged on an elastic film formed on the flow passage formation substrate to cover the plurality of pressure chambers. Each of the piezoelectric elements includes a piezoelectric film, a lower electrode film arranged on the piezoelectric film on a side near to the flow passage formation substrate, and an upper electrode film arranged on the piezoelectric film on a side far from the flow passage formation substrate. The piezoelectric elements are covered by a moisture-resistant protective film made of aluminum oxide. On the protective film, wires (lead electrodes) are formed to connect to the upper electrode films. Further, the wires are covered by a wire protection film (an insulating film).

The piezoelectric elements and the like each having the above mentioned structure are manufactured through the following steps. First, the lower electrode film of the piezoelectric elements is formed on the elastic film. Next, the piezoelectric film and the upper electrode film are formed and etched to pattern the piezoelectric elements. Next, the protective film is formed and patterned on the upper electrode film. Further, after forming the wires on the protective film to connect with the upper electrode films, the wire protection film is formed and patterned to cover a connecting portion between the wires and the upper electrode films.

SUMMARY

In aforementioned the ink jet head of Japanese Patent Application Laid-open No. 2006-7549, the piezoelectric elements are covered by the protective film. Because the protective film is provided primarily for preventing moisture from coming into the piezoelectric elements, the protective film covers the entire surfaces of the piezoelectric elements. In this structure, however, the protective film prevents the piezoelectric elements from deforming.

Therefore, the present inventors have conceived of removing some parts of the protective film covering the piezoelectric films, especially the parts covering the electrodes (the upper electrode films). In this case, the following manufacturing steps are conceivable. First, after the protective film is formed to cover the piezoelectric films and the electrodes on the upper surfaces thereof, the protective film is patterned to remove its parts covering the electrodes. Thereafter, after the wires are formed on the protective film, the wire protection film is formed to cover the wires. However, when adopting such manufacturing steps as described above, the wire protection film is formed after removing such parts of the protective film that cover the piezoelectric films. Therefore, when the wire protection film is formed after that, due to some gas produced during the film formation, reduction reactions and the like may take place in the piezoelectric films such that deterioration in the piezoelectric films is liable to occur.

An object of the present teaching is to provide a structure in which the protective film is less likely to prevent the deformation of the piezoelectric films by removing parts, of the protective film, covering the piezoelectric films. Another object of the present teaching is to eliminate deterioration of the piezoelectric films, during the manufacturing steps, beginning from the places where the protective film has been removed.

According to a first aspect of the present teaching, there is provided a method for manufacturing a liquid jetting apparatus including: a flow passage formation member in which a pressure chamber is formed to communicate with a nozzle; and a piezoelectric actuator having a vibration film provided on the flow passage formation member to cover the pressure chamber, a piezoelectric film arranged on the vibration film to correspond to the pressure chamber, a first electrode arranged on a surface of the piezoelectric film on a side near to the vibration film, a second electrode arranged on another surface of the piezoelectric film on a side far from the vibration film, a first protective film covering the piezoelectric film, a wire connected to the second electrode, and a second protective film covering the wire, the method including: a first protective film formation step of forming the first protective film on the vibration film to cover the piezoelectric film and the second electrode; a wire formation step of forming the wire; a second protective film formation step of forming the second protective film to cover the wire in a state of the first protective film covering the piezoelectric film and the second electrode; and a first removal step of removing a part, of the first protective film, that overlaps with the second electrode, after the second protective film formation step.

If moisture in the air comes into the piezoelectric film, then the piezoelectric film deteriorates. Hence, in order to prevent the moisture from coming thereinto, the first protective film covers the piezoelectric film. On the other hand, if the first protective film covers the entire piezoelectric film, then the first protective film prevents the piezoelectric film from deforming In the present teaching, since a part of the first protective film covering the piezoelectric film is removed, the piezoelectric film is less likely to be prevented from deforming by the first protective film. Further, the first protective film is removed in the part which overlaps with the second electrode. Since the piezoelectric film is covered by the second electrode in the place where the first protective film is removed, intrusion of the moisture into the piezoelectric film due to the removal of the first protective film can be prevented.

After forming the wire to be connected to the second electrode, in order to improve its electrical reliability, the second protective film is formed to cover the wire. In this stage, if the second protective film is formed after removing the part of the first protective film, deterioration may occur in the piezoelectric film at the part where the first protective film has been removed when forming the second protective film. In the present teaching, after forming the first protective film, the second protective film is formed with the first protective film covering the piezoelectric film, and the first protective film is partially removed thereafter. Since the first protective film covers the entire piezoelectric film during the formation of the second protective film, the piezoelectric film is prevented from deteriorating during the formation of the second protective film.

According to a second aspect of the present teaching, there is provided a liquid jetting apparatus including: a flow passage formation member in which a pressure chamber is formed to communicate with a nozzle; and a piezoelectric actuator provided on the flow passage formation member, wherein the piezoelectric actuator includes: a vibration film provided on the flow passage formation member to cover the pressure chamber; a piezoelectric film arranged on the vibration film to correspond to the pressure chamber; a first electrode arranged on a surface of the piezoelectric film on a side near to the vibration film; a second electrode arranged on another surface of the piezoelectric film on a side far from the vibration film; a first protective film covering the vibration film, the piezoelectric film, and the second electrode; a wire arranged on the first protective film and connected to the second electrode; and a second protective film covering the first protective film and the wire, wherein an opening is formed in a part, of the first protective film, that overlaps with the second electrode and the piezoelectric film, wherein the first protective film is arranged below the second protective film, and wherein within an area overlapping with the piezoelectric film, an entire area of the second protective film overlaps with the first protective film.

In the present teaching, since the opening is formed in the first protective film at the part overlapping with the piezoelectric film, the first protective film is less likely to prevent the deformation of the piezoelectric film. Further, the opening is formed in the first protective film at the part overlapping with the second electrode. Although the first protective film does not cover a part of the piezoelectric film, the moisture is still prevented from coming into the piezoelectric film because that part is covered by the second electrode. Further, the first protective film is provided below the second protective film, and within the area overlapping with the piezoelectric film, the entire area of the second protective film overlaps with the first protective film. Therefore, at least within the area overlapping with the piezoelectric film, the second protective film is less likely to be detached, because a difference in level of a surface on which the second protective film is formed is small, as compared with a case in which the second protective film partially overlaps with the first protective film within the area overlapping with the piezoelectric film.

DESCRIPTION OF THE EMBODIMENT

Figure 1:
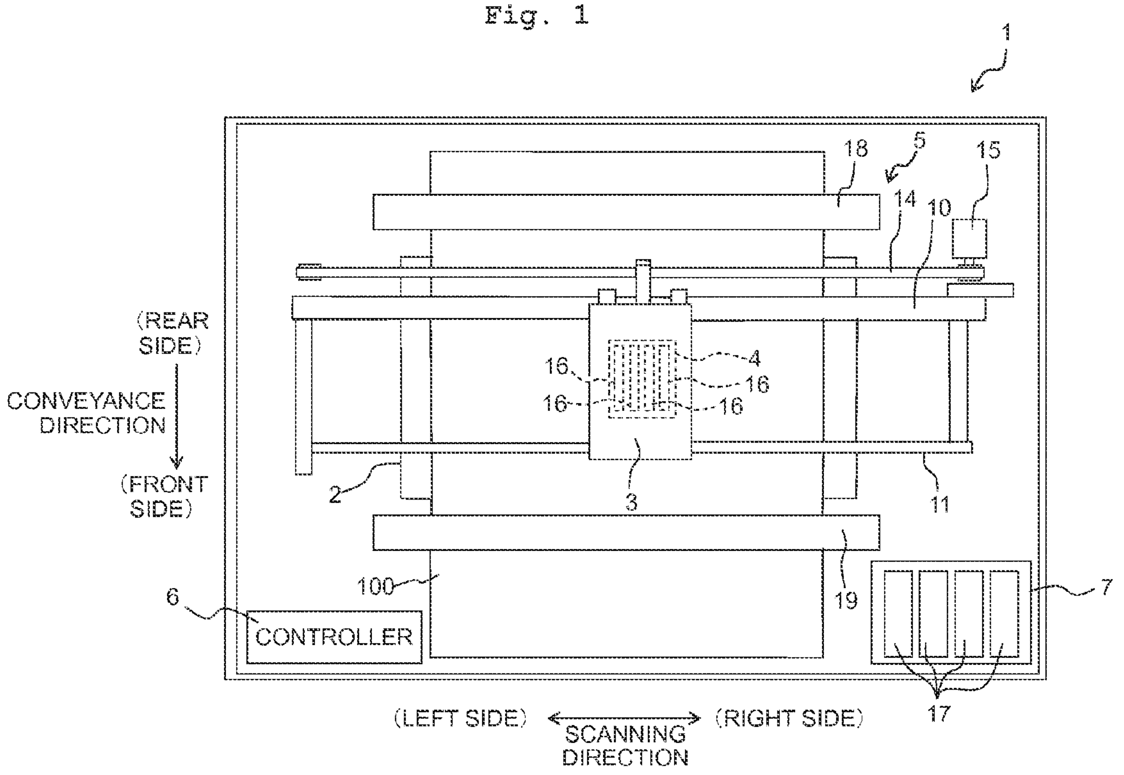
FIG. 1 is a schematic plan view of a printer in accordance with an embodiment of the present teaching.

Next, a preferred embodiment of the present teaching will be explained. First, referring to FIG. 1, a schematic configuration of an ink jet printer 1 will be explained. Further, the front, rear, left and right directions depicted in FIG. 1 are defined as "front", "rear", "left" and "right" of the printer, respectively. Further, the near side of the page of FIG. 1 is defined as "upper side" or "upside", while the far side of the page is defined as "lower side" or "downside" of the printer. The following explanation will be made while appropriately using each directional term of the front, rear, left, right, upside, and downside.

<Schematic Configuration of the Printer>

As depicted in FIG. 1, the ink jet printer 1 includes a platen 2, a carriage 3, an ink jet head 4, a conveyance mechanism 5, a controller 6, etc.

On the upper surface of the platen 2, a sheet of recording paper 100 which is a recording medium is placed. The carriage 3 is configured to be movable reciprocatingly in a left-right direction (also referred to below as a scanning direction) along two guide rails 10 and 11 in a region facing the platen 2. An endless belt 14 is linked to the carriage 3, and a carriage drive motor 15 drives the endless belt 14 whereby the carriage 3 moves in the scanning direction.

The ink jet head 4 is installed in the carriage 3 to move in the scanning direction together with the carriage 3. The ink jet head 4 includes four head units 16 aligning in the scanning direction. The four head units 16 are connected, respectively via non-depicted tubes, with a cartridge holder 7 in which ink cartridges 17 containing inks of four colors (black, yellow, cyan, and magenta) are installed. Each of the head units 16 has a plurality of nozzles 24 (see FIGS. 2 to 5) formed in its lower surface (the surface on the far side of the page of FIG. 1). The nozzles 24 of the respective head units 16 jet the inks supplied from the ink cartridges 17 toward the recording paper 100 placed on the platen 2.

The conveyance mechanism 5 has two conveyance rollers 18 and 19 arranged to interpose the platen 2 therebetween in a front-rear direction. With the two conveyance rollers 18 and 19, the conveyance mechanism 5 conveys the recording paper 100 carried on the platen 2 in a frontward direction (also referred to below as a conveyance direction).

The controller 6 is provided with a ROM (Read Only Memory), a RAM (Random Access Memory), an ASIC (Application Specific Integrated Circuit) including various types of control circuits, etc. Following programs stored in the ROM, the controller 6 uses the ASIC to carry out various processes such as printing on the recording paper 100 and the like. For example, in a printing process, based on a print command inputted from an external device such as a PC or the like, the controller 6 controls the ink jet head 4, the carriage drive motor 15 and the like to print images and the like on the recording paper 100. In particular, the controller 6 causes those members to alternately carry out a jet operation to jet the inks while moving the ink jet head 4 together with the carriage 3 in the scanning direction, and a conveyance operation to let the conveyance rollers 18 and 19 to conveyance the recording paper 100 in the conveyance direction by a predetermined length.

<Details of the Ink Jet Head>

Next, a detailed configuration of the ink jet head 4 will be explained while referring to FIGS. 2 to 5. Further, because all of the four head units 16 of the ink jet head 4 have the same configuration, one of the four will be explained, and explanation for the other head units 16 be omitted.

As depicted in FIGS. 2 to 5, the head unit 16 includes a nozzle plate 20, a flow passage formation member 21, a piezoelectric actuator 22, and a reservoir formation member 23. Further, in order to simplify FIG. 2, only an external form is drawn with a two-dot chain line to depict the reservoir formation member 23 positioned above the flow passage formation member 21 and the piezoelectric actuator 22.

<Nozzle Plate>

Figure 2:
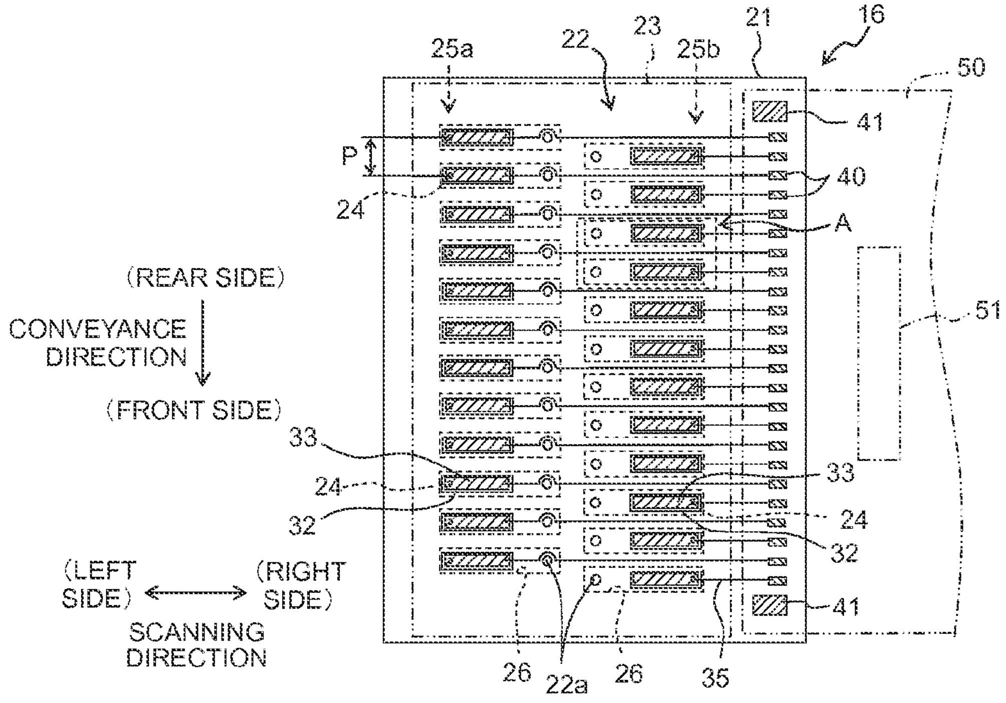
FIG. 2 is a top view of one head unit of an ink jet head.

The nozzle plate 20 is formed of a metallic material such as stainless steel or the like, silicon, a synthetic resin material such as polyimide or the like, or the like. A plurality of nozzles 24 are formed in the nozzle plate 20. As depicted in FIG. 2, the plurality of nozzles 24 to jet the ink of one color are aligned in the conveyance direction to form two nozzle rows 25*a* and 25*b* aligning in the left-right direction. Between the two nozzle rows 25*a* and 25*b*, the nozzles 24 deviate in position according to the conveyance direction by half the arrayal pitch P (P/2) of each nozzle row 25.

<Flow Passage Formation Member>

The flow passage formation member 21 is formed of silicon. The aforementioned nozzle plate 20 is jointed to the lower surface of the flow passage formation member 21. The flow passage formation member 21 is formed with a plurality of pressure chambers 26 in respective communication with the plurality of nozzles 24. Each of the pressure chambers 26 has such a planar shape as elongated in the scanning direction. The plurality of pressure chambers 26 are arrayed in the conveyance direction according to the arrayal of the aforementioned plurality of nozzles 24.

<Piezoelectric Actuator>

The piezoelectric actuator 22 imparts jetting energy to the inks in the plurality of pressure chambers 26 to respectively jet the inks from the nozzles 24. The piezoelectric actuator 22 is arranged on the upper surface of the flow passage formation member 21. As depicted in FIGS. 2 to 5, the piezoelectric actuator 22 has such a structure as to stack a plurality of film layers of a vibration film 30, a common electrode 31, a plurality of piezoelectric films 32, a plurality of individual electrodes 33, a first protective film 34, a plurality of wires 35, an insulating film 36, a second protective film 37, and the like. Further, in order to simplify FIG. 2, illustration is omitted for the first protective film 34 covering the piezoelectric films 32 and the second protective film 37 covering the wires 35 which are otherwise depicted in FIG. 3. As will be explained later on, the plurality of films constituting the piezoelectric actuator 22 are formed and etched on the upper surface of such a silicon substrate as to become the flow passage formation member 21, by way of a publicly known semiconductor processing technology.

Figure 3:
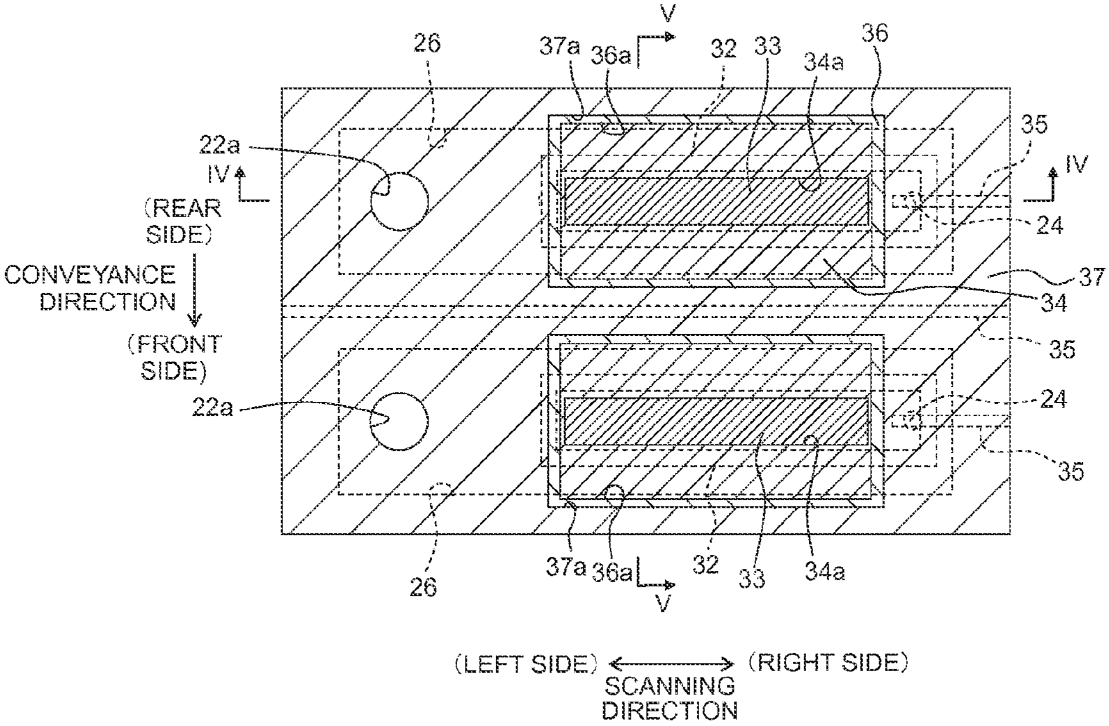
FIG. 3 is an enlarged view of part A of FIG. 2.

As depicted in FIGS. 2 and 3, a plurality of communicating holes 22*a* are formed in the piezoelectric actuator 22 at positions overlapping respectively with end portions of the plurality of pressure chambers 26. By virtue of these plurality of communicating holes 22*a*, flow passages in the aftermentioned reservoir formation member 23 are in respective communication with the plurality of pressure chambers 26.

The vibration film 30 is arranged on the entire area of the upper surface of the flow passage formation member 21 to cover the plurality of pressure chambers 26. The vibration film 30 is formed of silicon dioxide ($SiO_2$), silicon nitride ($SiN_x$), or the like. The vibration film 30 is as thick as, for example, 1 μm or so.

The common electrode 31 is formed of an electrically conductive material. The common electrode 31 is formed on almost the entire area of the upper surface of the vibration film 30 and arranged across the plurality of pressure chambers 26. While the common electrode 31 is not limited to a particular material, it is possible to adopt a two-layer structure of platinum (Pt) and titanium (Ti). In such a case, it is possible to form the platinum layer at 200 nm or so and the titanium layer at 50 nm or so.

The plurality of piezoelectric films 32 are formed on the upper surface of the vibration film 30 via the common electrode 31. Further, the plurality of piezoelectric films 32 are arranged to correspond respectively to the plurality of pressure chambers 26, and arrayed in the conveyance direction. As depicted in FIG. 3, each of the piezoelectric films 32 has such a planar shape as smaller than the pressure chamber 26 and elongated in the scanning direction. Each of the piezoelectric films 32 is arranged to overlap with the corresponding pressure chamber 26. The piezoelectric films 32 are formed of, for example, a piezoelectric material composed primarily of lead zirconate titanate (PZT) which is a mixed crystal of lead titanate and lead zirconate. The piezoelectric films 32 are as thick as, for example, from 1 μm to 5 μm or so.

Each of the individual electrodes 33 has a rectangular planar shape which is slightly smaller than the piezoelectric film 32. Each of the individual electrodes 33 is formed on a central portion of the upper surface of the piezoelectric film 32. The individual electrodes 33 are formed of, for example, iridium (Ir) or the like. The individual electrodes 33 are as thick as, for example, 80 nm or so.

Further, the aforementioned piezoelectric films 32 are interposed between the common electrode 31 arranged on its lower side (the near side to the vibration film 30), and the individual electrodes 33 arranged on its upper side (the far side from the vibration film 30). Further, the piezoelectric films 32 are polarized downwardly according to its thickness direction, that is, polarized in the direction from the individual electrodes 33 toward the common electrode 31.

Figure 4:
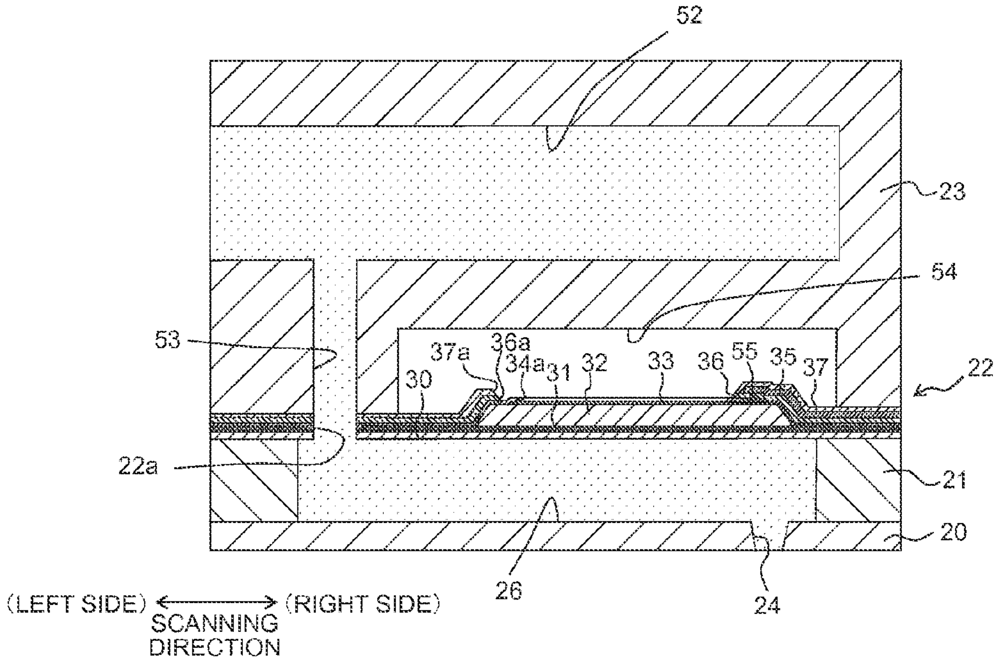
FIG. 4 is a cross-sectional view taken along the line IV-IV of FIG. 3.
Figure 5:
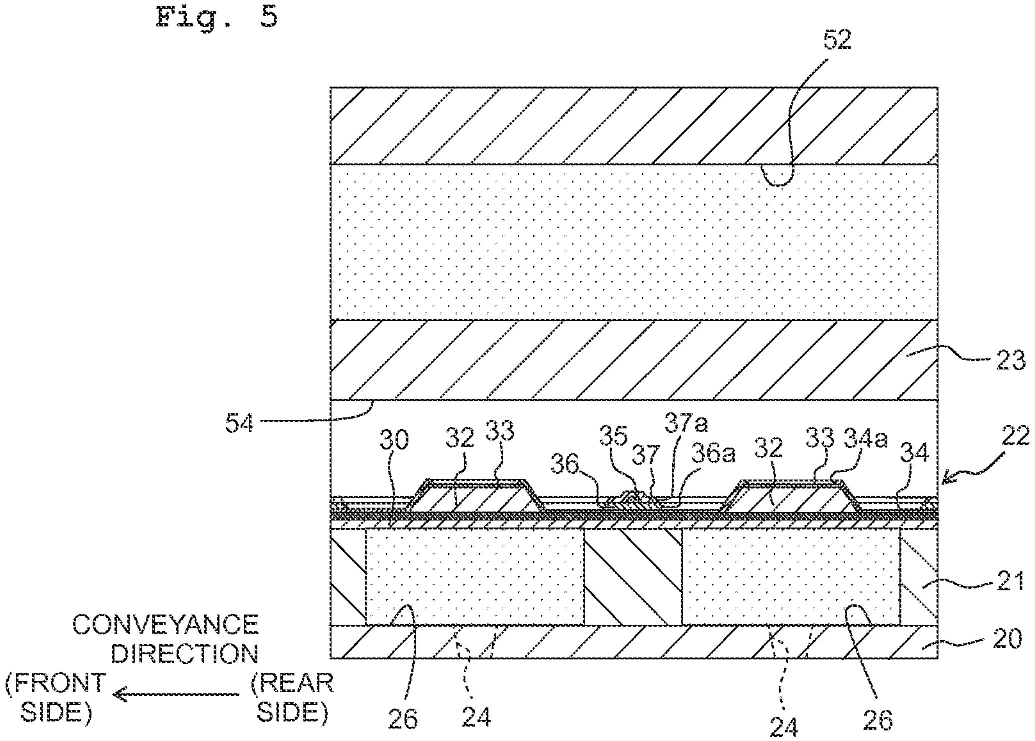
FIG. 5 is a cross-sectional view taken along the line V-V of FIG. 3.

As depicted in FIGS. 3 to 5, the first protective film 34 is formed over the common electrode 31 to cover the plurality of piezoelectric films 32. Further, the first protective film 34 is formed over almost the entire area of the vibration film 30 across the plurality of piezoelectric films 32. The first protective film 34 serves for preventing moisture contained in the air from coming into the piezoelectric films 32. The first protective film 34 is formed of a waterproof material such as alumina ($Al_2O_3$) or the like. The first protective film 34 is as thick as, for example, 80 nm or so. If moisture in the air comes into the piezoelectric films 32, then deterioration will occur in the piezoelectric films 32. However, because the first protective film 34 covers the piezoelectric films 32, the moisture is prevented from coming into the piezoelectric films 32.

However, if each of the piezoelectric films 32 is entirely covered by the first protective film 34, then the first protective film 34 prevents the piezoelectric film 32 from deforming when an electric field is caused to act on the piezoelectric film 32 to deform the piezoelectric film 32. In this embodiment, therefore, in order to reduce the degree of the first protective film 34 impeding the piezoelectric film 32 from deformation, a rectangular opening 34*a* is formed in such a part of the first protective film 34 as to overlap with a central portion of the upper surface of each of the piezoelectric films 32, as viewed from the thickness direction, such that the most part of each of the individual electrodes 33 is exposed from the first protective film 34. Further, although each of the piezoelectric films 32 is not covered by the first protective film 34 in the inside area of the opening 34*a*, it is covered by the individual electrode 33, whereby moisture is still prevented from coming into the piezoelectric film 32 from outside.

As depicted in FIGS. 3 to 5, the insulating film 36 is formed on the first protective film 34. The insulating film 36 is formed with openings 36*a* each of which is slightly larger than the opening 34*a* of the first protective film 34. Therefore, as depicted in FIGS. 4 and 5, the insulating film 36 covers only a little of the upper surface of each of the piezoelectric films 32 in two end portions of the piezoelectric film 32 according to its longitudinal direction, but does not cover the other part of the piezoelectric film 32. The plurality of wires 35, which will be described next, are arranged on the insulating film 36. The insulating film 36 is provided primarily for improving the insulation quality between the common electrode 31 and the plurality of wires 35. Without being limited to any particular material, the insulating film 36 is formed of, for example, silicon dioxide ($SiO_2$). Further, from the point of view of securing the insulation quality between the common electrode 31 and the wires 35, it is preferable for the insulating film 36 to have a certain film thickness such as from 300 nm to 500 nm.

On the insulating film 36, the plurality of wires 35 are formed in respective connection with the plurality of individual electrodes 33. The plurality of wires 35 are formed of an electrically conductive material such as aluminum (Al) or the like. Each of the wires 35 is arranged with its one end portion hanging over the upper surface of an end portion of the piezoelectric film 32 across the first protective film 34 and insulating film 36. Further, the first protective film 34 and the insulating film 36 are provided with a conducting portion 55 arranged to penetrate through those films and, through this conducting portion 55, the wires 35 are connected respectively with the individual electrodes 33 arranged on the upper surfaces of the piezoelectric films 32. Further, the plurality of wires 35 extend rightward respectively from the corresponding individual electrodes 33. Further, between the two nozzle rows 25, the wires 35 connected to the individual electrodes 33 corresponding to the left nozzle row 25*a* are arranged above the first protective film 34 and insulating film 36 between the piezoelectric films 32 corresponding to the right nozzle row 25*b*. That is, the wires 35 corresponding to the left nozzle row 25*a* extend rightward, passing between the piezoelectric films 32 corresponding to the right nozzle row 25*b*. Further, in order to prevent breaking of the wires and the like as much as possible, it is preferable for each of the wires 35 to have a certain thickness or more such as 1 μm or so.

The insulating film 36 under the wires 35 extends up to the right end of the flow passage formation member 21. Further, as depicted in FIG. 2, in a right end portion of the flow passage formation member 21, a plurality of drive contact portions 40 are arranged on the insulating film 36 to align in the conveyance direction. The plurality of wires 35, drawn out rightward respectively from the plurality of individual electrodes 33, are connected with the plurality of drive contact portions 40 positioned in the right end portion of the flow passage formation member 21. Further, in the right end portion of the flow passage formation member 21, two ground contact portions 41 are also arranged to connect with the common electrode 31 at the two opposite sides of the plurality of drive contact portions 40 according to the conveyance direction.

The second protective film 37 is formed over the insulating film 36 to cover the plurality of wires 35 mentioned above. The second protective film 37 is provided for the purposes of protecting the plurality of wires 35, securing the insulation between the plurality of wires 35, etc. The second protective film 37 is formed of, for example, silicon nitride ($SiN_x$) or the like. Further, the second protective film 37 is as thick as, for example, from 100 nm to 1 μm.

As depicted in FIGS. 3 to 5, the second protective film 37 is also formed with openings 37*a*. Each of the openings 37*a* is slightly larger than the opening 34*a* of the first protective film 34. Further, the opening 37*a* of the second protective film 37 is slightly larger than the opening 36*a* of the insulating film 36, and the two can be regarded as almost the same in size. The positional relation between the openings 34*a*, 36*a* and 37*a* of the three types of films 34, 36 and 37 is such that, first, the opening 36*a* of the insulating film 36 fits inside the opening 37*a* of the second protective film 37 and, further, the opening 34*a* of the first protective film 34 fits inside the opening 36*a* of the insulating film 36. By virtue of this, it is configured that the first protective film 34 is arranged under the second protective film 37 and insulating film 36 across the entire area of the second protective film 37 and insulating film 36. Therefore, within an area overlapping with the piezoelectric film 32, an entire area of the second protective film 37 overlaps with the first protective film 34. Further, within an area overlapping with the pressure chamber 26, an entire area of the second protective film 37 overlaps with the first protective film 34. In this configuration, compared with a configuration of arranging the first protective film 34 partially under the second protective film 37 and insulating film 36, there is a smaller difference in the level of the surfaces on which the second protective film 37 and the insulating film 36 are arranged. Thereby, the second protective film 37 and the insulating film 36 are less likely to be detached.

Further, as depicted in FIGS. 4 and 5, similar to the insulating film 36, the second protective film 37 covers only a little of the upper surface of each of the piezoelectric films 32 in the two end portions of the piezoelectric film 32 according to its longitudinal direction, but does not cover the other part of the piezoelectric film 32. Therefore, there is an extremely small degree of the second protective film 37 and the insulating film 36 impeding the piezoelectric films 32 from deformation.

In FIG. 2, while the second protective film 37 is omitted in illustration, the second protective film 37 covers the respective wires 35 from the connecting portions with the individual electrodes 33 to the connecting portions with the drive contact portions 40. Further, as described earlier on, the wires 35 connected to the individual electrodes 33 corresponding to the left nozzle row 25*a* extend rightward, passing between the piezoelectric films 32 corresponding to the right nozzle row 25*b*. On top of that, as depicted in FIGS. 3 and 5, the second protective film 37 is also formed between the piezoelectric films 32 arrayed in the conveyance direction, so as to cover the wires 35 arranged between the adjacent piezoelectric films 32. On the other hand, the second protective film 37 does not cover the plurality of drive contact portions 40 and ground contact portions 41 arranged in the right end portion of the flow passage formation member 21, and thus they are exposed from the second protective film 37.

As depicted in FIG. 2, a wiring member COF (Chip On Film) 50 is joined to the upper surface of the right end portion of the piezoelectric actuator 22 described earlier on. Then, a plurality of wires (not depicted) formed in the COF 50 are electrically connected with the plurality of drive contact portions 40, respectively. The controller 6 (sec FIG. 1) of the printer 1 is connected to the other end of the COF 50 than the end connected with the drive contact portions 40. Further, a driver IC 51 is mounted on the COF 50.

Based on a control signal sent in from the controller 6, the driver IC 51 generates and outputs a drive signal for driving the piezoelectric actuator 22. The drive signal outputted from the driver IC 51 is inputted to the drive contact portions 40 via the wires (not depicted) of the COF 50 and, further, supplied to the respective individual electrodes 33 via the wires 35 of the piezoelectric actuator 22. The individual electrodes 33 supplied with the drive signal change in potential between a predetermined drive potential and a ground potential. Further, the COF 50 is also formed with a ground wire (not depicted), and the ground wire is electrically connected with the ground contact portions 41 of the piezoelectric actuator 22. By virtue of this, the common electrode 31 connected with the ground contact portions 41 is constantly kept at the ground potential.

The following explanation will be made on an operation of the piezoelectric actuator 22 when supplied with the drive signal from the driver IC 51. Without being supplied with the drive signal, the individual electrodes 33 stay at the ground potential and thus have the same potential as the common electrode 31. From this state, if the drive signal is supplied to any of the individual electrodes 33 to apply the drive potential to that individual electrode 33, then due to the potential difference between that individual electrode 33 and the common electrode 31, the piezoelectric film 32 is acted on by an electric field parallel to its thickness direction. On this occasion, because the polarization direction of the piezoelectric film 32 conforms to the direction of the electric field, the piezoelectric film 32 extends in the thickness direction which is its polarization direction, and contracts in its planar direction. Along with the contraction deformation of the piezoelectric film 32, the vibration film 30 bows to project toward the pressure chamber 26. By virtue of this, the pressure chamber 26 decreases in volume to produce a pressure wave inside the pressure chamber 26, thereby jetting liquid drops of the ink from the nozzle 24 in communication with the pressure chamber 26.

<Reservoir Formation Member>

As depicted in FIGS. 4 and 5, the reservoir formation member 23 is arranged on the far side (the upper side) of the piezoelectric actuator 22 from the flow passage formation member 21 across the piezoelectric actuator 22, and joined to the upper surface of the piezoelectric actuator 22 by way of adhesive. While the reservoir formation member 23 may be formed of silicon, for example, as with the flow passage formation member 21, it may also be formed of other materials than silicon such as a metallic material or a synthetic resin material.

The reservoir formation member 23 has an upper half portion formed with the reservoir 52 extending in the conveyance direction. Through non-depicted tubes, the reservoir 52 is connected with the cartridge holder 7 (see FIG. 1) in which the ink cartridges 17 are installed.

As depicted in FIG. 4, the reservoir formation member 23 has a lower half portion formed with a plurality of ink supply flow passages 53 extending downward from the reservoir 52. The ink supply flow passages 53 are in respective communication with the plurality of communicating holes 22*a* of the piezoelectric actuator 22. By virtue of this, the inks are supplied from the reservoir 52 to the plurality of pressure chambers 26 of the flow passage formation member 21 via the plurality of ink supply flow passages 53 and the plurality of communicating holes 22*a*. Further, a concave protective cover portion 54 is also formed in the lower half portion of the reservoir formation member 23 to cover the plurality of piezoelectric films 32 of the piezoelectric actuator 22.

Next, referring to FIGS. 6A to 6E through FIGS. 10A to 10D, an explanation will be made on steps of manufacturing the aforementioned four head units 16 of the ink jet head 4 and, in particular, focused on the step of manufacturing the piezoelectric actuator 22. Each of FIGS. 6A to 10D serves to explain a step of manufacturing the ink jet head.

Figure 6A:
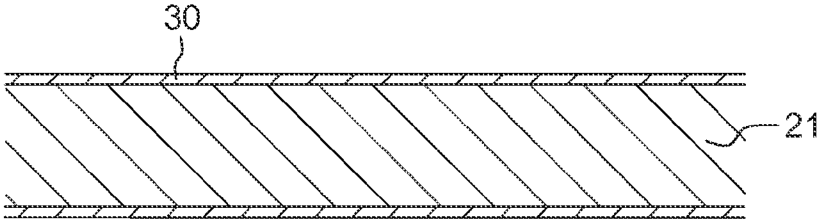
FIGS. 6A to 6E respectively depict a step of forming a vibration film, a step of forming a common electrode, a step of forming a piezoelectric material film, a step of forming an electroconductive film for individual electrodes, and a step of etching the electroconductive film (forming the individual electrodes).
Figure 6B:
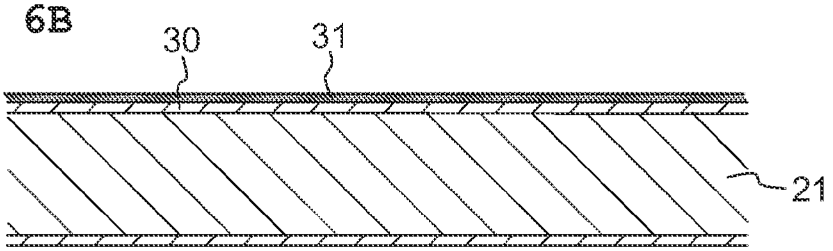
Figure 6C:
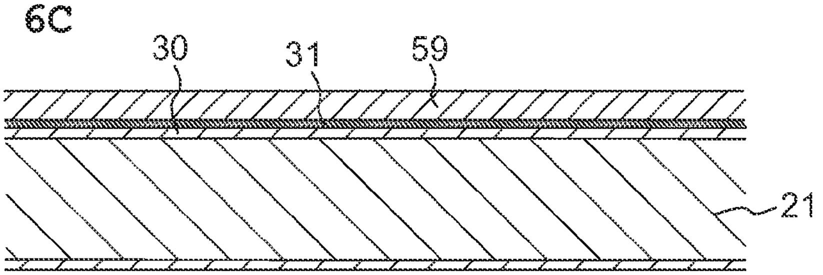

First, as depicted in FIG. 6A, the vibration film 30 of silicon dioxide is formed on a surface of the flow passage formation member 21 which is a silicon substrate. As a film formation method for the vibration film 30, it is possible to adopt thermal oxidation processing as preferred. Next, as depicted in FIG. 6B, the common electrode 31 is formed as a film on the vibration film 30 by way of sputtering or the like. Further, as depicted in FIG. 6C, a piezoelectric material film 59, which is made of a piezoelectric material such as PZT or the like, is formed on the entire area of the upper surface of the common electrode 31, by way of sol-gel method, sputtering, or the like.

Figure 6D:
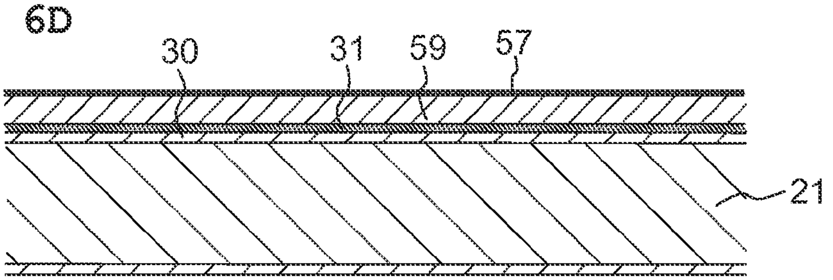
Figure 6E:
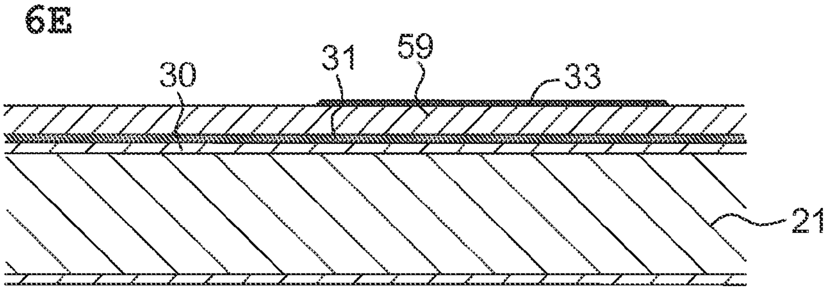

Further, the individual electrodes 33 are formed on the upper surface of the piezoelectric material film 59. First, as depicted in FIG. 6D, an electroconductive film 57 is formed on the upper surface of the piezoelectric material film 59 by way of sputtering or the like. Next, by etching the electroconductive film 57, the plurality of individual electrodes 33 are formed on the upper surface of the piezoelectric material film 59.

Figure 7A:
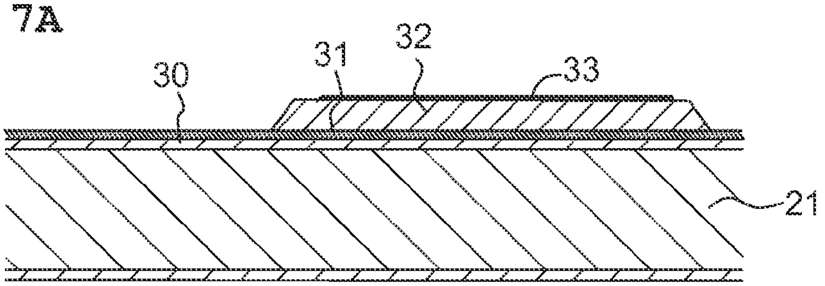
FIGS. 7A to 7E respectively depict a step of etching the piezoelectric material film (forming a piezoelectric film), a step of etching the common electrode, a step of forming a first protective film, a step of forming an insulating film, and a step of forming holes for (electrically) conducting the individual electrodes and wires.
Figure 7B:
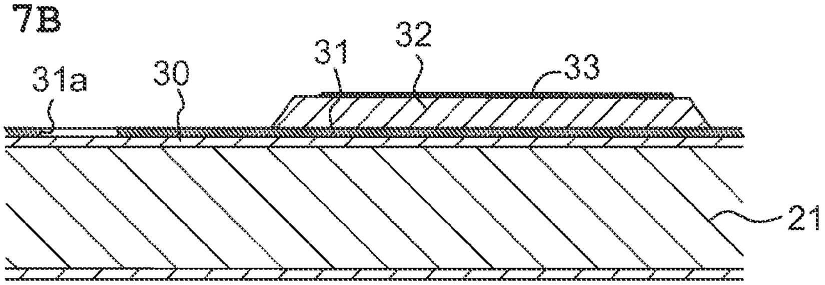

As depicted in FIG. 7A, the piezoelectric material film 59 is etched to form the plurality of piezoelectric films 32. Further, as depicted in FIG. 7B, the common electrode 31 is etched to form a hole 31*a* to constitute part of each of the communicating holes 22*a* (see FIG. 4) of the piezoelectric actuator 22.

Figure 7C:
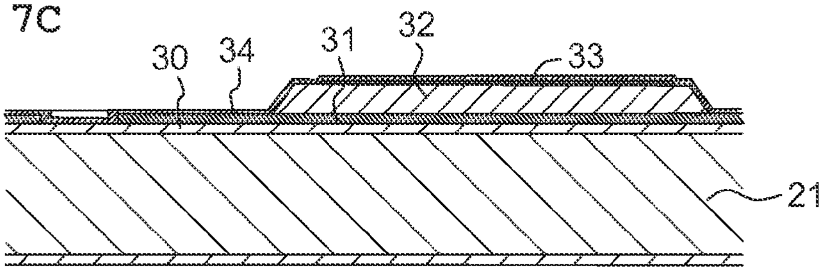
Figure 7D:
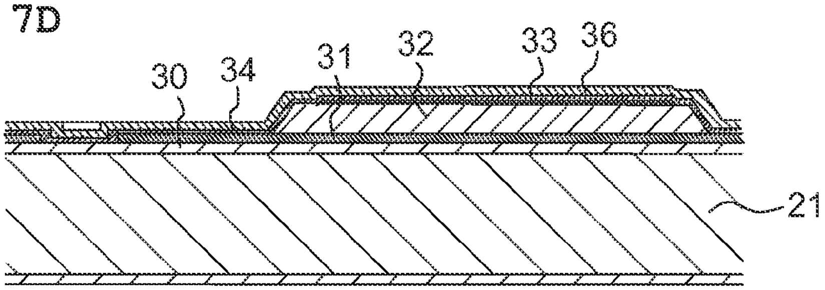

Next, as depicted in FIG. 7C, the first protective film 34 is formed by way of sputtering or the like to cover the plurality of piezoelectric films 32 and the plurality of individual electrodes 33. Further, as depicted in FIG. 7D, the insulating film 36 is formed on the first protective film 34.

It is possible to form the insulating film 36 made of silicon dioxide by way of plasma CVD as preferred. However, without being limited to the plasma CVD mentioned above, it is also possible to form the insulating film 36 by way of other film formation method such as spin coating method or the like.

Figure 7E:
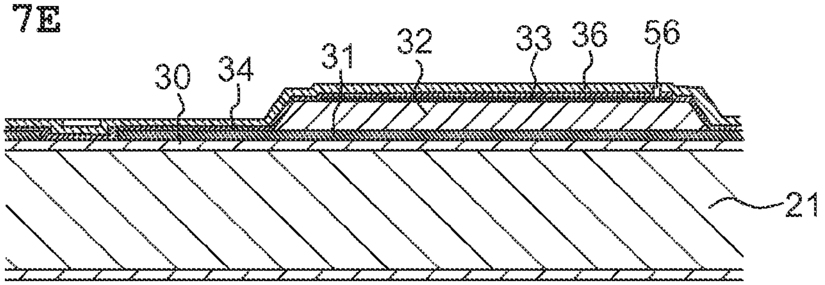

After forming the first protective film 34 and the insulating film 36, as depicted in FIG. 7E, a hole 56 is formed by way of etching in such a part of the first protective film 34 and insulating film 36 as to cover an end portion of each of the individual electrodes 33. The holes 56 serve for electrical conduction between the individual electrodes 33, and the wires 35 to be formed on the insulating film 36 in the next step.

Figure 8A:
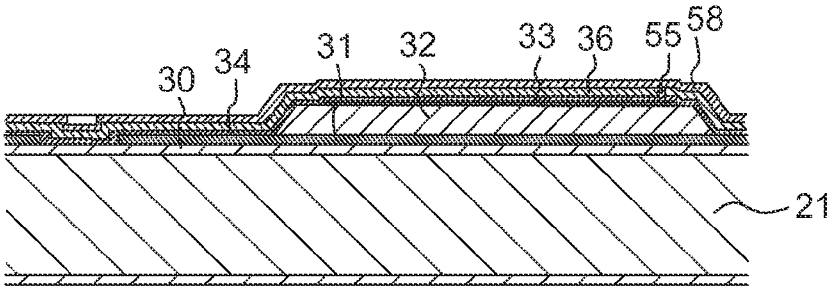
FIGS. 8A to 8C respectively depict a step of forming an electroconductive film for the wires, a step of etching the electroconductive film (forming the wires), and a step of forming a second protective film.
Figure 8B:
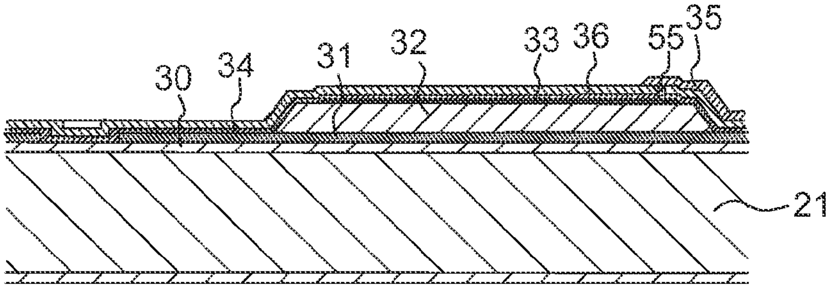

Next, the plurality of wires 35 are formed on the insulating film 36 upon the first protective film 34. First, as depicted in FIG. 8A, an electroconductive film 58 is formed on the upper surface of the insulating film 36 by way of sputtering or the like. On this occasion, the holes 56 are filled with part of an electroconductive material to form a conducting portion 55 in each of the holes 56 to electrically conduct the individual electrodes 33 and the electroconductive film 58. Next, as depicted in FIG. 8B, the electroconductive film 58 is etched to remove unnecessary parts and form each of the plurality of wires 35.

Figure 8C:
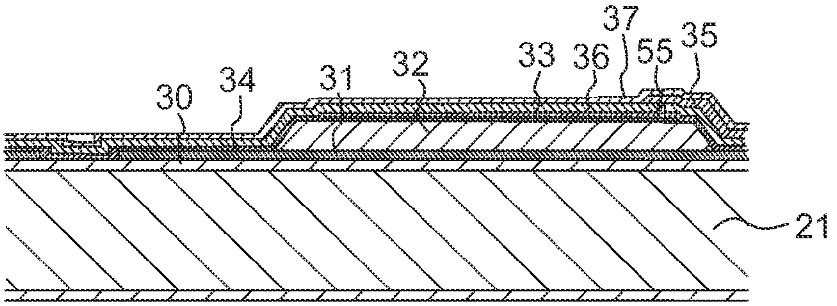

Next, as depicted in FIG. 8C, the second protective film 37 is formed to cover the plurality of wires 35. As with the insulating film 36 formed previously, it is preferable to form the second protective film 37 made of silicon nitride ($SiN_x$) by way of plasma CVD.

In this case, by supplying a silane and ammonia gas as carrier gas, and via plasma gasification of the carrier gas to decompose the same, the second protective film 37 of silicon nitride is formed on the insulating film 36 of silicon dioxide. Further, other than plasma CVD, it is also possible to form the second protective film 37 by way of low pressure CVD (LPCVD) which is a type of thermal CVD to produce the reaction at low pressure.

At this stage of forming the second protective film 37 by way of plasma CVD or the like, when the carrier gas is decomposed, substances having strong reducing capability are produced such as hydrogen and the like. Further, if hydrogen is produced, then it comes in various forms such as hydrogen molecule, atom, ion, and the like. If such reducing substances come into the piezoelectric films 32, then because reduction reactions occur between those substances and the piezoelectric material such as the PZT and the like forming the piezoelectric film 32, the piezoelectric film 32 is subjected to deterioration. Further, as mentioned earlier on, in the upper surfaces of the piezoelectric films 32, moisture is prevented by the individual electrodes 33 from coming into the areas covered by the individual electrodes 33. However, the hydrogen produced in the above step is extremely smaller than water and, furthermore, is activated by the plasma. Therefore, even though the upper surfaces of the piezoelectric films 32 are covered by the individual electrodes 33, the hydrogen can still easily pass through the individual electrodes 33 to come into the piezoelectric films 32.

In this embodiment, however, when forming the second protective film 37, the refined first protective film 34 made of alumina covers the piezoelectric films 32, and the individual electrodes 33 arranged on the upper surfaces of the piezoelectric films 32. Therefore, the reducing substances, such as the hydrogen gas and the like produced in forming the second protective film 37, are reliably prevented from coming into the piezoelectric films 32, thereby restraining the piezoelectric films 32 from deterioration.

Figure 9A:
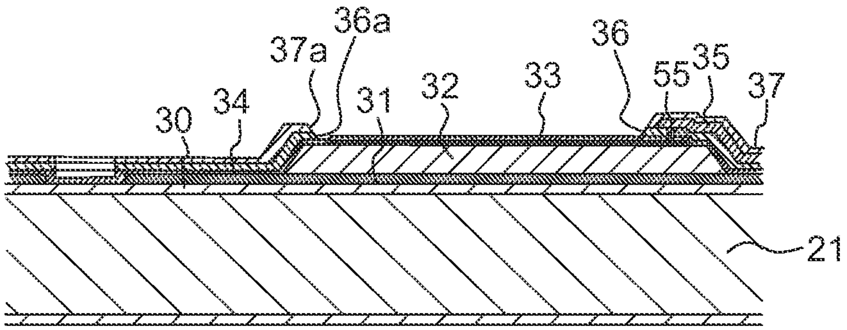
FIGS. 9A to 9C respectively depict a step of partially removing (etching) the insulating film and the second protective film, a step of partially removing (etching) the first protective film, and a step of forming (etching) holes in the vibration film.

Next, as depicted in FIG. 9A, the second protective film 37 and the insulating film 36 are etched to remove such parts of the second protective film 37 and the insulating film 36 that overlap with the upper surfaces of the piezoelectric films 32, respectively. By virtue of this, the openings 37*a* are formed in the second protective film 37 while the openings 36*a* are formed in the insulating film 36 to expose the first protective film 34 thereunder. Further, as described above, the insulating film 36 and the second protective film 37 may be etched once to remove those parts in a single etching step. However, the insulating film 36 and the second protective film 37 may also be etched to remove the same in different etching steps.

Figure 9B:
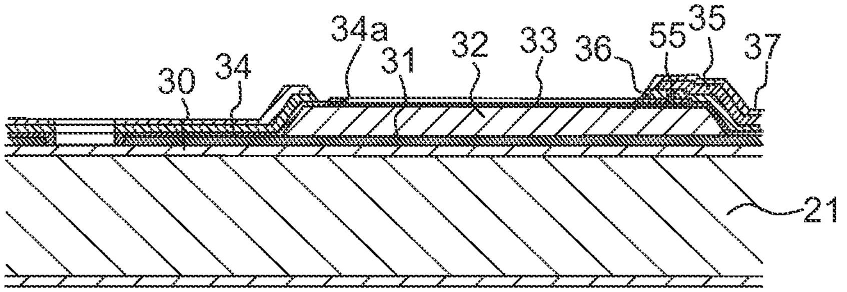

Further, as depicted in FIG. 9B, by etching the first protective film 34 exposed from the second protective film 37 and insulating film 36, and removing such parts of the first protective film 34 that overlap with the individual electrodes 33, the openings 34*a* are formed in the first protective film 34. Further, because the first protective film 34 is etched after etching the second protective film 37, each of the openings 37*a* of the second protective film 37 is larger than the opening 34*a* of the first protective film 34.

Figure 9C:
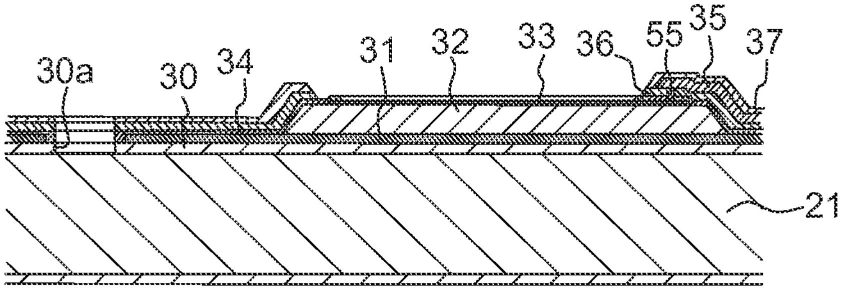

Next, as depicted in FIG. 9C, the vibration film 30 is etched to form the holes 30*a* each of which constitutes part of the communicating hole 22*a* (see FIG. 4) of the piezoelectric actuator 22. With the step of FIG. 9C, manufacturing of the piezoelectric actuator 22 is finished.

Figure 10A:
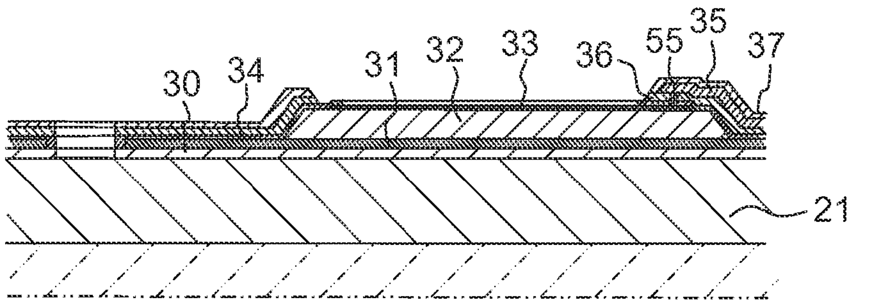
FIGS. 10A to 10D respectively depict a step of abrading a flow passage formation member, a step of etching the flow passage formation member, a step of joining a nozzle plate, and a step of joining a reservoir formation member.

First, as depicted in FIG. 10A, the flow passage formation member 21, in which the ink flow passages will be formed, is abraded from the lower side (the far side from the vibration film 30), so as to thin the flow passage formation member 21 to a predetermined thickness. While the original silicon wafer, from which the flow passage formation member 21 is formed, is as thick as approximately from 500 μm to 700 μm, the flow passage formation member 21 is thinned to 100 μm or so by this abrading step.

Figure 10B:
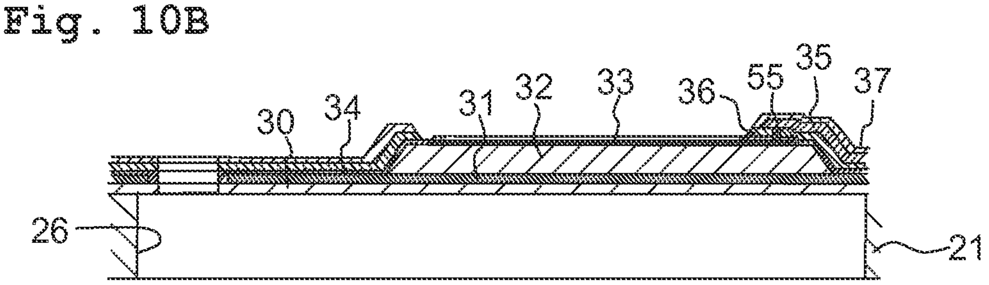
Figure 10C:
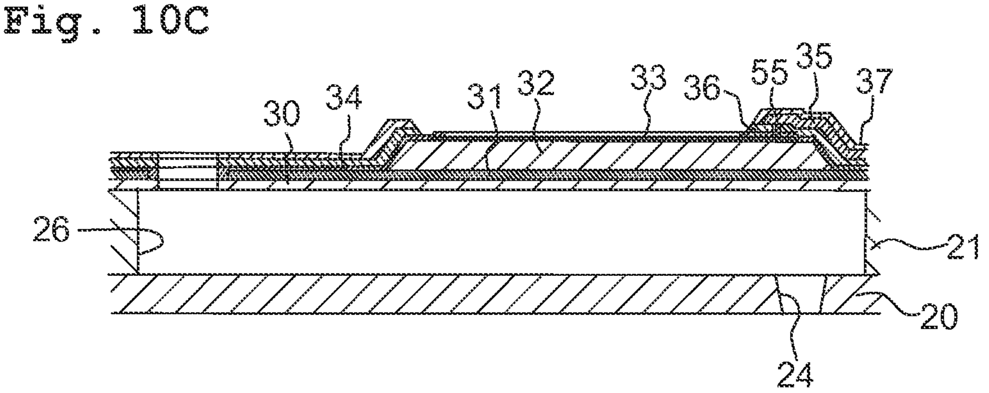
Figure 10D:
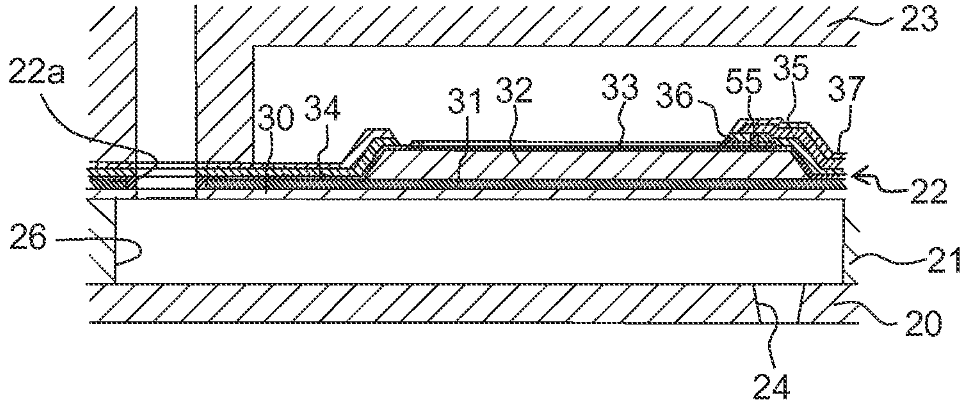

After the above abrasion, as depicted in FIG. 10B, the pressure chambers 26 are formed by etching the flow passage formation member 21 from the lower side, i.e., the far side from the vibration film 30. Further, as depicted in FIG. 10C, the nozzle plate 20 is joined onto the lower surface of the flow passage formation member 21 by way of adhesive. Finally, as depicted in FIG. 10D, the reservoir formation member 23 is joined onto the piezoelectric actuator 22 by way of adhesive.

In the embodiment described above, after forming the first protective film 34 to cover the piezoelectric films 32, such parts of the first protective film 34 are removed that overlap with the individual electrodes 33 on the upper surfaces of the piezoelectric films 32. By removing the parts of the first protective film 34 covering the piezoelectric films 32, the first protective film 34 is restrained from impeding deformation of the piezoelectric films 32. Further, the removed parts of the first protective film 34 are those overlapping with the individual electrodes 33. That is, because the individual electrodes 33 cover the areas of the piezoelectric films 32 where the first protective film 34 is removed, moisture is maximally restrained from coming in even though the first protective film 34 is removed there.

However, if the second protective film 37 is formed after the first protective film 34 is removed partially as described above, then the piezoelectric films 32 are liable to deteriorate in the parts where the first protective film 34 is removed when forming the second protective film 37. Especially, if the second protective film 37 of silicon nitride ($SiN_x$) is formed by way of plasma CVD or the like, then when the carrier gas is decomposed by the plasma, reducing substances are produced such as hydrogen and the like having a strong reducing capacity and, due to those reducing substances, the piezoelectric films 32 are liable to aggravate its deterioration from the areas where the first protective film 34 is removed. In this regard, however, in this embodiment the first protective film 34 is removed partially (see FIG. 9B) after the second protective film 37 is formed (see FIG. 8C) after the first protective film 34 is formed (see FIG. 7C). That is, when forming the second protective film 37 as in the stage of FIG. 8C, the piezoelectric films 32 are entirely covered by the first protective film 34. Therefore, the piezoelectric films 32 are prevented from deterioration when forming the second protective film 37.

In the embodiment explained above, the ink jet head 4 jetting the inks corresponds to the "liquid jetting apparatus" of the present teaching. The common electrode 31 positioned under the piezoelectric films 32 corresponds to "the first electrode" of the present teaching. The individual electrodes 33 positioned upon the piezoelectric films 32 correspond to "the second electrode" of the present teaching.

Next, a few modifications will be explained which apply various changes to the embodiment described above. However, the same reference numerals are assigned to the components having an identical or similar configuration to those in the abovementioned embodiment, and any explanation therefor will be omitted as appropriate.

In the above embodiment, the insulating film 36 is provided between the first protective film 34 and the wires 35. However, the insulating film 36 may be omitted in cases where it is possible to secure a sufficient insulation between the wires 35 and the common electrode 31 with the first protective film 34 alone.

Figure 11A:
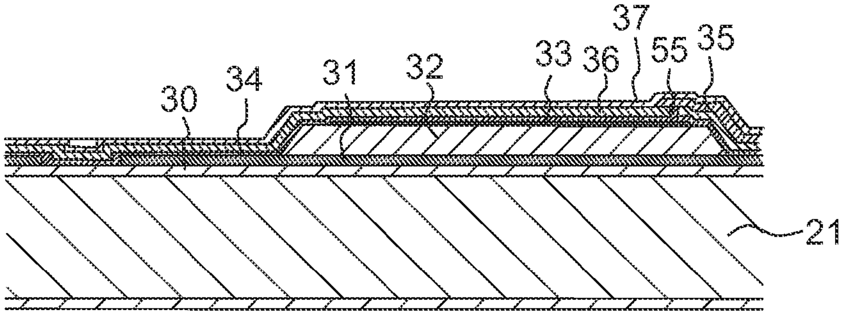
FIGS. 11A and 11B are diagrams for explaining steps related to forming and removing a first protective film, an insulating film and a second protective film in accordance with a modification.
Figure 11B:
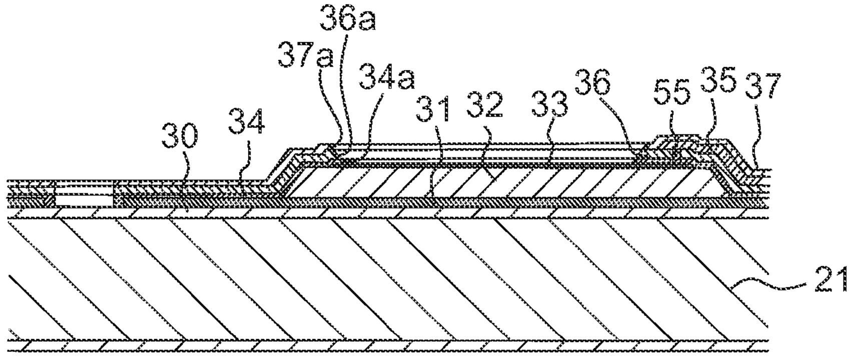

In the above embodiment, after forming the second protective film 37 (see FIG. 8C), the first protective film 34 is partially removed by way of etching (see FIG. 9B) after the second protective film 37 and the insulating film 36 are partially removed by way of etching (see FIG. 9A). In contrast to this, after forming the second protective film 37 covering the wires 35 as depicted in FIG. 11A, it is possible to remove such parts of the first protective film 34 and the second protective film 37 that overlap with the individual electrodes 33, simultaneously through one etching process as depicted in FIG. 11B. Further, in this case, the openings 34*a* formed in the first protective film 34 have almost the same size as the openings 37*a* formed in the second protective film 37. Further, as depicted in FIGS. 11A and 11B, if the insulating film 36 is present between the first protective film 34 and the second protective film 37, then as depicted in FIG. 11B, such parts of the insulating film 36 that overlap with the individual electrodes 33 are also removed simultaneously with the first protective film 34 and the second protective film 37.

In the above embodiment, the second protective film 37 and the like are patterned (see FIG. 9A) by removing the unnecessary parts by way of etching after forming the second protective film 37 (and the insulating film 36) thoroughly over the first protective film 34. In contrast to this, the second protective film 37 and the like may be formed and patterned simultaneously. For example, in areas unnecessary for forming the second protective film 37 (and the insulating film 36) such as the areas where the individual electrodes 33 are arranged, a mask may be formed of a resist in advance. Then, the second protective film 37 is formed thoroughly thereon, and the resist is detached thereafter. In this manner, the second protective film 37 is formed and patterned.

Figure 12:
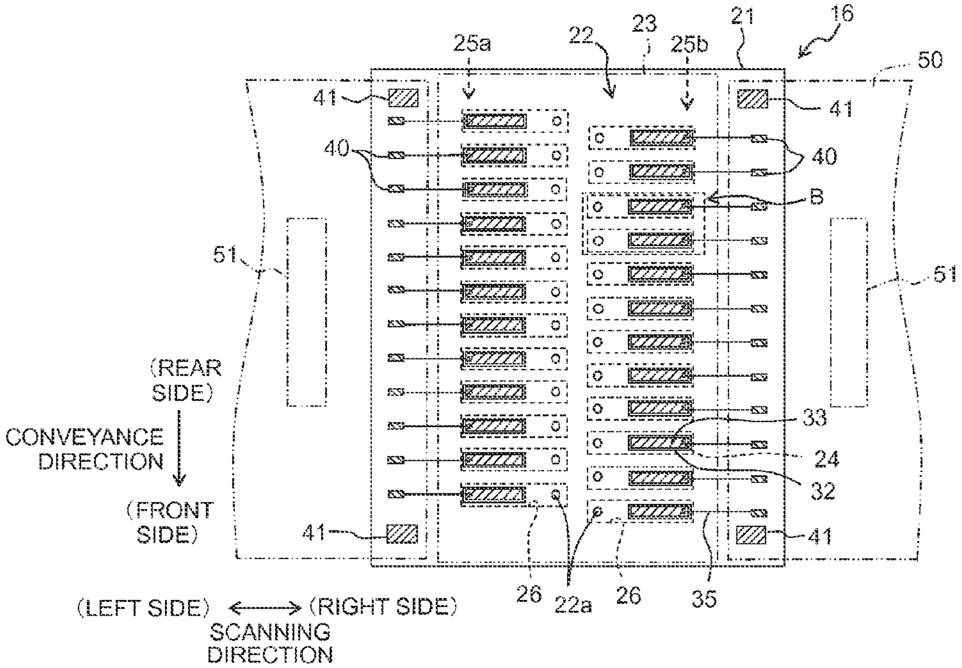
FIG. 12 is a plan view of one head unit of an ink jet head in accordance with another modification.
Figure 13:
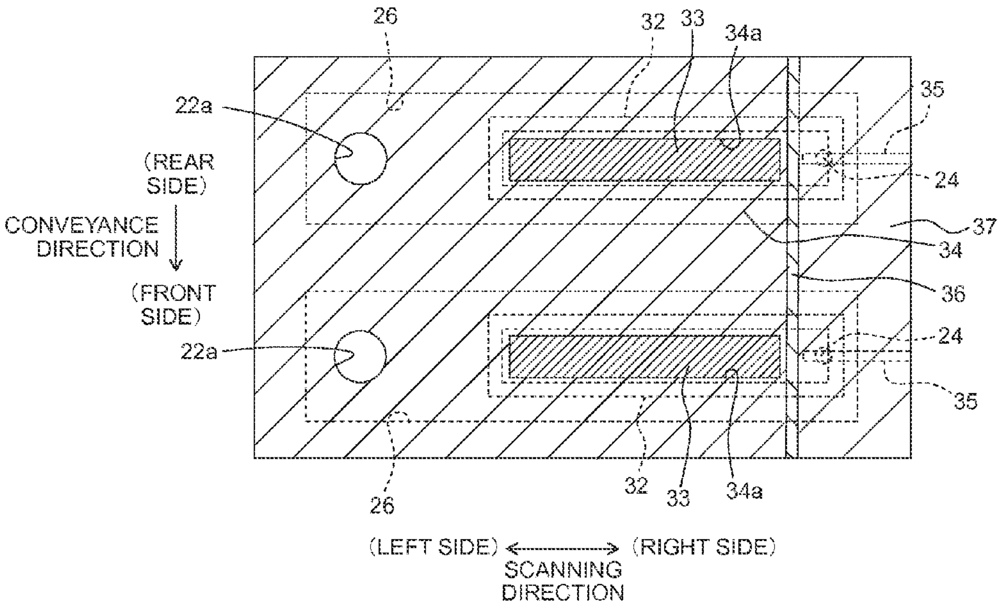
FIG. 13 is an enlarged view of part B of FIG. 12.

In the above embodiment, the wires 35 corresponding respectively to the piezoelectric films 32 arrayed on the left side in FIG. 2 pass between the other piezoelectric films 32 arrayed on the right side, and are drawn out up to the drive contact portions 40 in the right end portion of the flow passage formation member 21. However, the configuration is not limited to such an arrangement as for the wires 35 corresponding to the other piezoelectric films 32 to pass between the adjacent piezoelectric films 32. For example, as depicted in FIG. 12, the wires 35 corresponding to the piezoelectric films 32 arrayed on left side may be drawn out leftward and connected to the drive contact portions 40 arranged in a left end portion of the flow passage formation member 21, whereas the wires 35 corresponding to the piezoelectric films 32 arrayed on right side may be drawn out rightward and connected to the drive contact portions 40 arranged in a right end portion of the flow passage formation member 21. Further, in this case, because the wires 35 are not arranged between the adjacent piezoelectric films 32 according to the conveyance direction, the insulating film 36 and the second protective film 37 need not be formed between the piezoelectric films 32 but may be formed only in areas on the left and right sides of the arrangement area of the piezoelectric films 32, as depicted in FIG. 13.

In the above embodiment, the common electrode 31 is arranged under the piezoelectric films 32 (on the near side to the vibration film 30) while the individual electrodes 33 are arranged above the piezoelectric films 32 (on the far side from the vibration film 30). However, the common electrode 31 and the individual electrodes 33 may be arranged with their vertical positions reversed or exchanged.

The ink flow passages of the ink jet head 4 are not limited to the configuration of the above embodiment. For example, it is possible to make changes as below. In the above embodiment as depicted in FIG. 4, the flow passages are configured to supply the inks from the reservoir 52 in the reservoir formation member 23 to the plurality of pressure chambers 26 via the plurality of communicating holes 22*a*, individually and respectively. In contrast to this, a flow passage corresponding to the aforementioned reservoir 52 may be formed in the flow passage formation member 21. For example, a manifold flow passage may be formed to extend in the arrayal direction of the plurality of pressure chambers 26 and, inside the flow passage formation member 21, the inks may be distributively supplied from the one manifold flow passage to the plurality of pressure chambers 26, individually.

The embodiment and its modifications explained above have applied the present teaching to an ink jet head configured to print images and the like by jetting ink to recording paper. However, it is also possible to apply the present teaching to any liquid jetting apparatuses used for various purposes other than printing images and the like. For example, it is possible to apply the present teaching to liquid jetting apparatuses which jet an electrically conductive liquid to a substrate to form a conductive pattern on a surface of the substrate.

What is claimed is:

1. A method for manufacturing a liquid jetting apparatus; wherein the liquid jetting apparatus includes:

a flow passage formation member in which a pressure chamber is formed to communicate with a nozzle; and a piezoelectric actuator having;

a vibration film provided on the flow passage formation member to cover the pressure chamber;
a piezoelectric film arranged on the vibration film to correspond to the pressure chamber;
a first electrode arranged on a surface of the piezoelectric film on a side near to the vibration film;
a second electrode arranged on another surface of the piezoelectric film on a side far from the vibration film;
a first protective film covering the piezoelectric film;
a wire connected to the second electrode; and
a second protective film covering the wire;

wherein the method comprises:
a first protective film formation step of forming the first protective film on the vibration film to cover the piezoelectric film and the second electrode;
a wire formation step of forming the wire;
a second protective film formation step of forming the second protective film to cover the wire in a state of the first protective film covering the piezoelectric film and the second electrode; and
a first removal step of removing a part, of the first protective film, that overlaps with the second electrode, after the second protective film formation step, so that part of the second electrode is exposed.

2. The method according to claim 1;
wherein a reducing substance is produced in the second protective film formation step.

3. The method according to claim 2;
wherein the second protective film made of silicon nitride is formed by a CVD method in the second protective film formation step.

4. The method according to claim 1;
wherein in the second protective film formation step, the second protective film is formed to overlap with a part, of the first protective film, that covers the piezoelectric film;
wherein the method further comprises a second removal step of removing a part, of the second protective film, that overlaps with the piezoelectric film after the second protective film formation step; and
wherein the first protective film under the second protective film is exposed in the second removal step, and then a part, of the exposed first protective film, that covers the second electrode is removed in the first removal step.

5. The method according to claim 1;
wherein in the second protective film formation step, the second protective film is formed to overlap with a part, of the first protective film, that covers the piezoelectric film; and
wherein parts of the first protective film and the second protective film that cover the second electrode are removed in the first removal step.

6. A liquid jetting apparatus comprising:
a flow passage formation member in which a pressure chamber is formed to communicate with a nozzle; and
a piezoelectric actuator provided on the flow passage formation member;
wherein the piezoelectric actuator comprises:
a vibration film provided on the flow passage formation member to cover the pressure chamber;
a piezoelectric film arranged on the vibration film to correspond to the pressure chamber;
a first electrode arranged on a surface of the piezoelectric film on a side near to the vibration film;
a second electrode arranged on another surface of the piezoelectric film on a side far from the vibration film;
a first protective film covering the vibration film, the piezoelectric film, and the second electrode;
a wire arranged on the first protective film and connected to the second electrode; and
a second protective film covering the first protective film and the wire;
wherein an opening is formed in a part, of the first protective film, that overlaps with the second electrode and the piezoelectric film, wherein the first protective film is arranged below the second protective film, so that a part of the second electrode is exposed from the opening.

7. The liquid jetting apparatus according to claim 6;
wherein:
the pressure chamber is one of a plurality of pressure chambers formed in the flow passage formation member;
the piezoelectric film is one of a plurality of piezoelectric films arranged on the vibration film to correspond to the plurality of pressure chambers respectively;
the first protective film is formed across the plurality of piezoelectric films; and
the wire connected to the second electrode on one of the piezoelectric films is arranged on the first protective film between another piezoelectric films and is covered with the second protective film.

8. The liquid jetting apparatus according to claim 6;
wherein, within an area overlapping with the pressure chamber, an entire area of the second protective film overlaps with the first protective film.

9. The liquid jetting apparatus according to claim 6;
wherein the first protective film is arranged below the second protective film, so that an entire area of the second protective film overlaps with the first protective film.

* * * * *